(12) United States Patent
Nash

(10) Patent No.: US 11,171,854 B2
(45) Date of Patent: Nov. 9, 2021

(54) APPLICATION WORKLOAD PREDICTION

(71) Applicant: INTERNATIONAL BUSINESS MACHINES CORPORATION, Armonk, NY (US)

(72) Inventor: Henry P. Nash, Clevedon (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 15/406,085

(22) Filed: Jan. 13, 2017

(65) Prior Publication Data

US 2018/0205666 A1 Jul. 19, 2018

(51) Int. Cl.
G06F 15/16 (2006.01)
H04L 12/26 (2006.01)
H04L 12/24 (2006.01)
H04L 29/08 (2006.01)

(52) U.S. Cl.
CPC ...... H04L 43/0876 (2013.01); H04L 41/0896 (2013.01); H04L 67/10 (2013.01); H04L 67/32 (2013.01); H04L 41/147 (2013.01)

(58) Field of Classification Search
CPC ........... H04L 47/803; H04L 43/0875; H04L 43/0876; H04L 41/0896; H04L 67/32; H04L 41/147; G06F 9/5038
USPC ........................................................ 709/223
See application file for complete search history.

(56) References Cited

U.S. PATENT DOCUMENTS

| 2008/0168211 | A1* | 7/2008 | Nicholson | G06F 3/061 711/100 |
| 2012/0054466 | A1* | 3/2012 | Devendran | G06F 12/10 711/207 |
| 2015/0113120 | A1* | 4/2015 | Jacobson | G06N 5/04 709/224 |
| 2015/0229582 | A1 | 8/2015 | Zhu et al. | |
| 2015/0256476 | A1* | 9/2015 | Kurtzman | H04L 47/70 709/226 |
| 2015/0286507 | A1 | 10/2015 | Elmroth et al. | |
| 2015/0350108 | A1 | 12/2015 | Baughman et al. | |
| 2016/0232036 | A1* | 8/2016 | Zhu | H04L 47/762 |
| 2017/0351546 | A1* | 12/2017 | Habak | G06F 9/5027 |
| 2018/0267863 | A1* | 9/2018 | Auvenshine | H04L 67/1029 |

OTHER PUBLICATIONS

Alvaro Wong, "Parallel Application Signature for Performance Analysis and Prediction", 2015.*

(Continued)

Primary Examiner — Jeffrey R Swearingen
Assistant Examiner — Messeret F Gebre
(74) Attorney, Agent, or Firm — Griffiths & Seaton PLLC

(57) ABSTRACT

Proposed are concepts for predicting workload of an application. Resource usage of a first application is monitored to obtain resource usage data associated with the first application. A workload signature for the first application is generated based on the obtained resource usage data, wherein the workload signature comprises information relating to static and time variant resource usage of the first application. Resource usage of a second application is predicted based on the workload signature of the first application.

17 Claims, 5 Drawing Sheets

(56) References Cited

OTHER PUBLICATIONS

F. Liu and R. Liu, "Monitoring of Grid Performance Based-on Agent," 2007 2nd International Conference on Pervasive Computing and Applications, 2007, pp. 29-34 (Year: 2007).*

Manley, K. T. (2002). Monitoring web application performance and ISAPI. Dr.Dobb's Journal, 27(7), 65-8. Retrieved from https://dialog.proquest.com/professional/docview/830732648?accountid=131444 (Year: 2002).*

P. Leitner, C. Inzinger, W. Hummer, B. Satzgerand S. Dustdar, "Application-level performance monitoring of cloud services based on the complex event processing paradigm," 2012 Fifth IEEE International Conference on Service-Oriented Computing and Applications (SOCA), 2012, pp. 1-8 (Year: 2012).*

Shanmuganathan et al., "Towards Proactive Resource Management in Virtualized Datacenters," Runtime Environments, Systems, Layering and Virtualized Environments (RESoLVE'13), Mar. 2013 (6 pages).

* cited by examiner

APPLICATION WORKLOAD PREDICTION

BACKGROUND

The present invention relates to predicting resource usage of an application.

Cloud computing offers users applications that may use large pools of computational/processing, networking and storage resources. Cloud-based providers use virtualization of hardware techniques which enable resources to be shared in order to satisfy the workload of applications. Since different workloads have different resource usage characteristics, one aspect of running an efficient cloud computing environment relates to the allocation and/or distribution of application workload.

SUMMARY

According to an embodiment of the present invention there is provided a computer-implemented method for application workload prediction. The method comprises: monitoring resource usage of a first application to obtain resource usage data associated with the first application; generating a workload signature for the first application based on the obtained resource usage data, the workload signature comprising information relating to static and time variant resource usage of the first application; and predicting resource usage of a second application based on the workload signature of the first application.

According to another aspect, there is provided computer program product for application workload prediction. The computer program product comprises a computer readable storage medium having program instructions embodied therewith, the program instructions executable by a processing unit to cause the processing unit to perform a method. The method comprises: monitoring resource usage of a first application to obtain resource usage data associated with the first application; generating a workload signature for the first application based on the obtained resource usage data, the workload signature comprising information relating to static and time variant resource usage of the first application; and predicting resource usage of a second application based on the workload signature of the first application.

According to yet another aspect, there is provided a processing system comprising at least one processor and the computer program product according to one or more embodiments. The at least one processor is adapted to execute the computer program code of the computer program product.

According to another aspect, there is provided a system for application workload prediction. The system comprises: a monitoring unit adapted to monitor resource usage of a first application to obtain resource usage data associated with the first application; a data analysis unit adapted to generate a workload signature for the first application based on the obtained resource usage data, the workload signature comprising information relating to static and time variant resource usage of the first application; and a prediction unit adapted to predict resource usage of a second application based on the workload signature of the first application

BRIEF DESCRIPTION OF THE DRAWINGS

Preferred embodiments of the present invention will now be described, by way of example only, with reference to the following drawings, in which.

DETAILED DESCRIPTION

Figure 1:
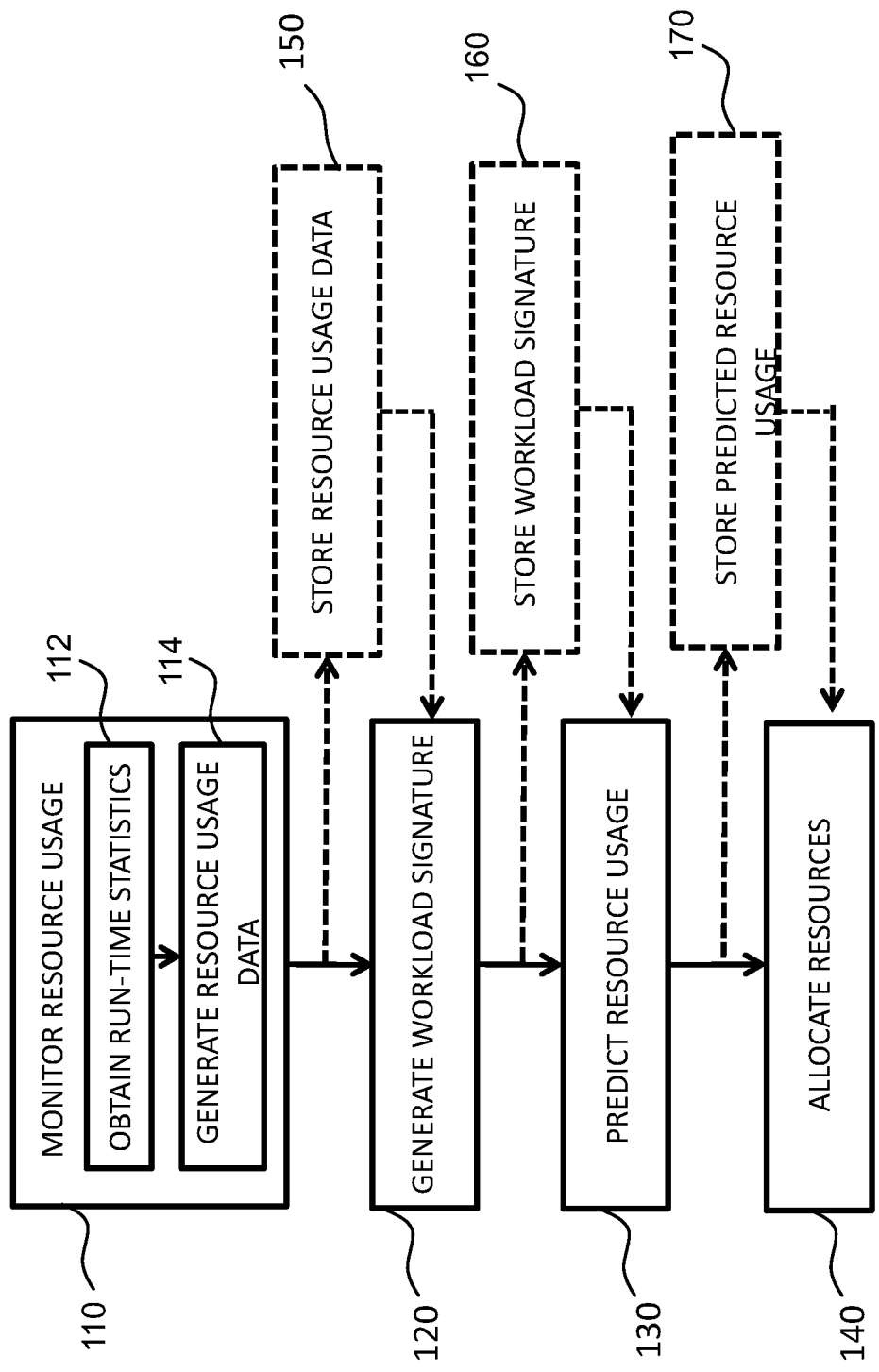
FIG. 1 depicts a flow diagram of method for application workload prediction according to an embodiment.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for predicting workload of an application. In particular, proposed embodiments may use data analytics to generate a workload signature that characterizes an application's resource usage. Such predicted resource usage may enable the prediction of the resource usage of another application. For instance, a prediction of resource usage may be based on how closely a workload signature matches that of known resource usage or workload.

Rather than deriving a workload signature from the code of an application, embodiments may derive a workload signature comprising information relating to static and time variant resource usage of the application, and this may be done from analyzing how the application interacts with (e.g. uses) resources. For instance, a workload of an application that has high network traffic around a particular date (such as Black Friday when lots of online sales are offered for example) may be expected to also experience high network traffic on other dates with similar properties (such as dates in the run up to Christmas, for example). Conversely, a workload of an application which experiences little network traffic at night, but has a spike (e.g. sudden increase) in network traffic at around 8 am, dropping off again at 5 pm, may be inferred to be a business-focused application. Such a business-focused application may be expected to not have a spike in network traffic at Christmas. Thus, an inferred workload signature may enable prediction of resource requirements for external events that have not yet been seen/experienced. For instance, a semantic understanding of an external event may be used to infer other matching or similar events that will lead to particular resources usage or requirements. Of course, such comparison of workload signatures need not be exact (e.g. if it can be determined that a new application is not a business related application but is related to shopping cycles, predictions regarding resource requirements may still be made). Embodiments may therefore enable prediction of resource usage for an application for which only a few attributes are known and important for which upcoming resources spikes (positive or negative) have yet to be confirmed.

Also, the use of geolocation databases may can further refine such workload characterizations, for example by identifying the approximate location of the source of network traffic. For example, a spike in network traffic local to a city on a game night of the local sports team may enable characterization of a fan-based social application tied to whenever the sports team is scheduled to play. This may enable prediction of required resources based on the sports team's match schedule. By employing data analysis system and method which may deduce connections between datasets, such characterizations of workload may be automatically inferred and described.

By monitoring resource usage of an application to obtain resource usage data associated with the application, embodiments may avoid a need to assess or monitor a workload for the length of a typical time-variant resource usage cycle (which may typically be measured in months or years) in order to automatically generate information for use in a workload placement algorithm. Embodiments may therefore enable rapid and continuous generation of information relating to resource usage of an application, for example as soon as the application is executed for the first time. Such provision of resource usage information without needing to complete an entire resource usage cycle may enable quick assessment of resource usage and proactive prediction and allocation of resources for an application.

Proposed concepts may enable the prediction of an application workload through assessment of previously obtained information relating to static and time variant resource usage of one or more applications. For instance, correlation of an application with previously obtained workload behavior of other applications may enable the same or similar workload or resource usage traits to be inferred for the application. Also, information relating to trigger events upon which the time variant resource usage of application depends may be used to predict workload or resource usage, for example using information about expected or forecast events. Identifying or predicting future events that may cause similar variations in workload may enable the proactive allocation of resources and/or distribution of workload ahead of the event occurrence.

Embodiments may seek to provide a network component for predicting and/or managing resources usage in a cloud-computing environment that may operate dynamically (e.g. respond or adapt to changing events or event occurrences) and proactively (e.g. allocate workload and/or resources ahead of predicted or expected events).

Conventional workload management or distribution concepts typically do not cater for time-varying workloads. Proposed embodiments, on the other hand, may address this short-coming and enable prediction of resource usage (which may be time-variant). Such prediction may, in some embodiments, be achieved relatively rapidly in respect of newly executed application and without a long period of monitoring being required.

Proposed may be a concept of predicting resource usage of an application based on information relating to resource usage of another application and/or a previous execution of the application. The information may be thought of as a characterization or signature associated with an application and may comprise information relating to a monitored or measured resource usage of the application. Such resource usage may comprise a measure of a static, stable, average or steady-state resource usage and may also comprise a measure of a time variant, abnormal, irregular or modified resource usage (that may be associated with a trigger or event occurrence for example).

Embodiments may therefore enable the allocation of resources for an application based on predicted resource usage of the application.

Thus, there may also be provided a system which may allow the distribution of workload and/or allocation of resources for an application, and this may be done according to predictions which may, for example, take account of predicted or expected variations in workload caused by triggers or event occurrences. A network component, such as a switch component, and/or a traffic management component, (such as a server module for example) may thus be proposed which may predict resource usage for an application and may even allocate resources based on the predicted resource usage. Embodiments may therefore provide a connectivity component which can adapt to implementation specifics and cater for changes in available resources (e.g. applications, service and/or flows) and event occurrences, thereby providing a high degree of flexibility and adaptability.

In an embodiment, a proposed system may comprise a cloud sever, and an application implementing a proposed method may comprise a cloud application. Embodiments may therefore be employed in a Software as a Service (SaaS) environment for the provision of cloud-based services over the internet for example.

Illustrative embodiments may therefore provide concepts for characterizing application resource usage and for predicting resource usage of an application. Dynamic workload distribution and resource allocation optimization may therefore be provided by proposed embodiments.

Modifications and additional steps to a traditional SaaS implementation may also be proposed which may enhance the value and utility of the proposed concepts.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention.

Also, those of ordinary skill in the art will appreciate that the hardware and/or architectures in the Figures may vary depending on the implementation. Further, the processes of the illustrative embodiments may be applied to multiprocessor/server systems, other than those illustrated, without departing from the scope of the proposed concepts.

Moreover, the system may take the form of any of a number of different processing devices including client computing devices, server computing devices, a tablet computer, laptop computer, telephone or other communication devices, personal digital assistants (PDAs), or the like. In some illustrative examples, a system may comprise a portable computing device that is configured with flash memory to provide non-volatile memory for storing operating system files and/or user-generated data, for example. Thus, the system may essentially be any known or later-developed processing system without architectural limitation.

A proposed concept may enhance a cloud-based service provisioning system by catering for or managing network traffic or making operations more efficient. Such proposals may extend or improve the processing capabilities or efficiency of a cloud-based software delivery system.

By way of further explanation, an embodiment will now be described, wherein five main components may be employed: a monitoring module, a (server-based) collector module; a (server-based) analysis and classification module; a (server-based) resource usage predictor module; and a (server-based) placement interface module.

The monitoring module may be adapted to track the virtual resources usage of a virtual machine or container-based workload. For example, this may be built into a cloud platform. An alternative monitoring module may be provided for workloads running on physical machines.

The collector module may receive or obtain data produced by the monitoring module. In this way, the collector module may collect, store and organize data from the monitoring module in order to facilitate analysis of the data.

The analysis and classification module may be adapted to process data of the collector module in respect of an application and, in conjunction with other correlating data, may generate a classification (e.g. workload signature) for the application.

The resource usage predictor module may use the data from the classification module to generate a prediction of an application's resource usage.

The placement interface module may be adapted to respond to requests from (or send updates to) a workload placement algorithm regarding the predicted resource usage of a given workload or workloads Thus, in such an example embodiment, both the analysis and classification module and the predictor module may be adapted to interface with external data/information sources, cognitive systems and other information-based analysis tools, in order to first classify the application, as well as well generate a prediction of future resource usage. In other words, the embodiment may be adapted to make use of external or remotely located (e.g. centralized) information or data resources to assist or facilitate in data analysis and predication generation.

For this exemplary embodiment, when a new application instance needs to be deployed for the first time, nothing may be known about it. To accommodate this initial lack of information, a placement algorithm may use some standard/predetermined starting default value(s), data, or information as a default starting point. Once the application is running, the monitoring module may start sending details of its resource usage (e.g. compute, processor utilization, available memory, network traffic, storage capability, etc.) to the collector module. The collector module may then store the details, tagged with an application identifier (ID). The analysis and classification module may then start comparing the (as yet brief) statistics with other applications' statistics and their classifications. If it determined that there is a reasonable match, then it may give this new application instance a similar classification. This analysis process may be continuously updated or repeated as more statistics are gathered on workloads, and associated classifications may be continuously reassessed.

The analysis and classification module may use external sources, cognitive systems and other information based analysis tools to categorize what is triggering any changes/deltas in resource changes in classes of application. Based on available classifications, the resource usage predictor module may provide an updated prediction of resource usage for a new application instance.

The resource usage predictor module may also use external sources, cognitive systems and other information based analysis tools to generate the prediction of resource usage. Such a prediction may include future prediction of spikes and/or drops in resource usage (which have not yet been seen in this new application, but are deduced by nature of the classification), thereby allowing the placement algorithms to prepare for these sudden changes ahead of time.

Classification Structure:

By way of example of the structure and information of a classification (or workload signature) for an application, for this embodiment, the classification may contain a series of sets of information about each resource, in the following form:

Resource type (e.g. CPU, memory, network, storage, load-balancer etc.)

Steady-state resource consumption (e.g. average or static resource usage)

Trigger event(s) (e.g. time variant resource usage description of increases/decreases in resource usage/consumption associated with occurrence of a particular trigger/event)

For improved understanding of such a classification structure according to an embodiment, an exemplary classification may be represented as follows:

```
Workload: App1: [
    {
        resource_type: cpu
        steadystate: 0.5
        triggers: [
            {
                type: time
                start: 12:00
                end: 17:00
                frequency: weekdays
                delta: +2
            }
        ]
    }
    {
        resource_type: network
        steadystate: 10
        triggers: [
            {
                type: time
                start: 20:00
                end: 22:00
                frequency: weekdays
                delta: +50
            }
        ]
    }
    {
        resource_type: storage
        steadystate: 5
    }
```

It will be understood that, in the above-detailed example, the classification may describe an application ("App1") that in general has light resource usage, but CPU resource usage increases between 12 noon and 5 pm on weekdays and networking resource usage spikes high between 8 pm and 10 pm on weekdays (e.g. because it is a social network app for a television network). Also, the storage resource usage remains relatively constant (e.g. in a substantially steady state with no notable spikes or dips in resource usage. Thus, the above example may be thought of as including information relating to triggers or events upon which the time variant resource usage depends It will, however, be appreciated that for implementation where the resource usage predictor module has access to external cognitive and information based analysis systems, triggers can be more than just time-based. Descriptions of examples of other triggers may include the following:

```
{
    type: temperature
    below: 4C
    delta: +100
}
{
    type: event
    title: Football game
    delta: +200
}
{
    type: event
    title: Elections
    delta: +200
}
```

Such triggers may be viewed as examples of forecast information, and these combined with information of workload signature to predict resource usage for an application. In this way, forecast information may comprise information that describes a predicted or planned event, incident, occasion or circumstance. For example, the information may comprise a description of at least one of: the event type; the event timing; the event duration; related resources; an impact on resources; a value of an event parameter; a dependency of the event on another event (e.g. Event A executes if Event B occurs and Event C is also true/occurs concurrently); and a dependency of the event on resources. Based on a classification and forecast information, resource usage may be predicted. For instance, for the above-detailed example classification for "App1", the following description of predicted resource usage may be generated in view of the example triggers of the preceding paragraph:

"Light resource usage, Memory & Networking spikes 100× on Saturdays between noon and 5 pm" (e.g. a sport app for fans);

"Light resource usage, Memory & Networking spikes 2× on when temperature falls below 4 C or during storms" (e.g. customer relations application); and "Light resource usage, Compute, Storage & Networking spikes 1000× during federal elections (e.g. political outreach application).

Referring now to FIG. 1, there is illustrated an exemplary flow diagram of a method for application workload prediction according to a proposed embodiment.

The method may begin in step 110 wherein resource usage of a first application is monitored to obtain resource usage data associated with the first application. In this example, the step 110 of monitoring resource usage of the first application may comprise the steps of: obtaining 112 run-time statistics relating to the execution of the first application; and generating 114 resource usage data based on the obtained run-time statistics. In this way, monitoring 110 resource usage of the first application may be undertaken at run-time (e.g. during execution) to collect statistics or information about resource in real-time. From such real-time information/statistics, resource usage data may be generated, again in real-time. Such real-time/run-time collection of information and generation of resources usage data may be repeatedly undertaken while the first application is running, so as to repeatedly or continuously generate and refine resource usage data. This may enable resource usage data to be built and maintained as and when available resources or flows change for example.

In step 120, a workload signature for the first application may be generated based on the resource usage data obtained from step 110. In this example, the workload signature may comprise information relating to: (i) static (e.g. average, steady-state or typical) resource usage of the first application; (ii) time variant resource usage (e.g. increases/decreases) of the first application; and (iii) trigger events (e.g. times, dates, events, circumstances) upon which the time variant resource usage may depend. Completion of step 120 may therefore provide a workload signature for the first application, wherein the workload signature provides a description of how the first application use resources during typical, normal or average operation and during abnormal or isolated circumstances. Based on the information provided by the workload signature, the method may predict resource usage of a second application in step 130.

The step 130 of predicting resource usage of the second application may, for example, also be based on forecast information relating to one or more expected future events. For instance, forecast information may comprise information describing a predicted or planned event, incident, occasion or circumstances that may be used in combination with information of a workload signature to predict how resource usage may react to the event, incident, occasion or circumstances. By way of example, the information may include a description of at least one of: the event type; the event timing; the event duration; related resources; an impact on resources; a value of an event parameter.

Using the predicted resource usage from step 130, resources may be allocated for the second application in step 140. Put another way, allocation of resources may be undertaken based on the predicted resource usage.

It is noted that repeated execution of steps of the method of FIG. 1 may repeatedly generate and refine resource usage predictions and/or resource allocation. This may enable predictions and/or resource allocations to be constantly updated and improved (e.g. in view of new/additional information, and/or when resources/circumstances change).

It is also noted that additional steps of storing resource usage data (Step 150), storing a workload signature (Step 160) and storing predicted resource usage (Step 170) are illustrated in FIG. 1. These steps are represented using dashed lines to indicate that the steps may or may not be included in the method, for example depending on the specific implementation. It is therefore to be understood that example embodiments may include the storing at least one of: the resource usage data; the workload signature; and predicted resource as historical information for use in at least one of: generating a workload signature; and predicting resource usage of the second application.

Accordingly, in some embodiments, the step 120 of generating a workload signature may comprise analyzing historical workload information relating to at least one of: previously obtained resource usage data; and a previously generated workload signature. Additionally, or alternatively, the step 130 of predicting resource usage may comprise analyzing historical prediction information relating to at least one of: a previously generated workload signature; and previously predicted resource usage. Such previously obtained information may be provisioned locally (e.g. where step 150, 160 or 170 has been adapted to store the information in a local data store or database) or remotely (e.g. where step 150, 160 or 170 has been adapted to store the information in remote or extern data store provided by a cloud-based server).

Figure 2:
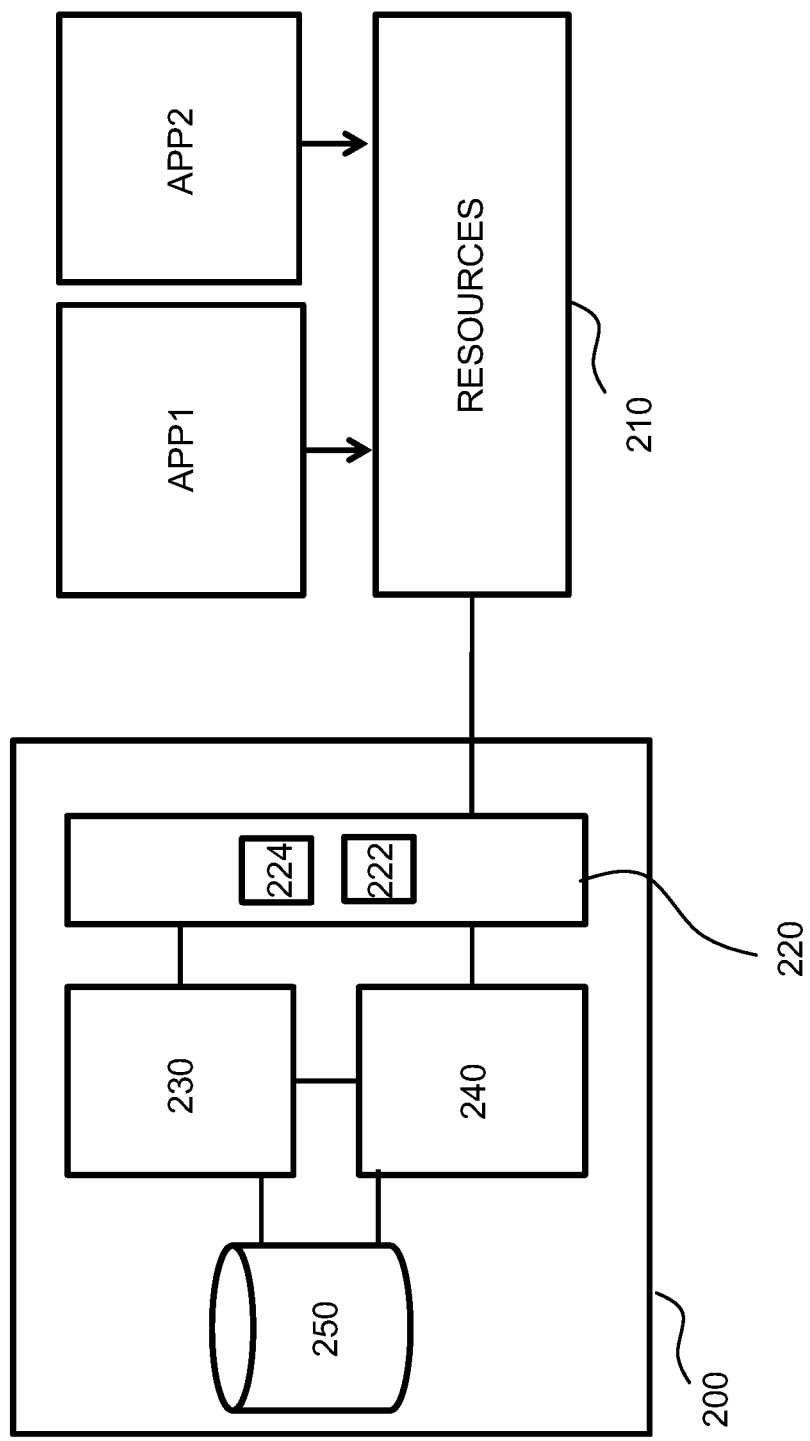
FIG. 2 is a simplified block diagram of an exemplary implementation of an embodiment.

Referring now to FIG. 2, there is depicted a simplified block diagram of a system 200 for application workload prediction according to an embodiment. Here, the system may be included in a network component, such as a switch or traffic management component (within a server module for example). The system may predict usage of resources 210 for an application and may even allocate the resources 210 based on the predicted resource usage.

The system 200 comprises a central processing unit which is adapted to implement a monitoring unit 222 and a resource allocation unit 224. The monitoring unit 222 may monitor resource 210 usage of a first application APP1 to obtain resource usage data associated with the first application. In doing so, the monitoring unit 222 may be adapted to: obtain run-time statistics relating to the execution of the first application APP1; and generate resource usage data based on the obtained run-time statistics.

The system 200 also comprise a data analysis unit 230 which may generate a workload signature for the first application APP1 based on the obtained resource usage data. The workload signature generated by the data analysis unit 230 may comprising information relating to static and time variant resource usage of the first application APP1. To generate such information of the workload signature, the data analysis unit 230 may analyze historical workload information relating to at least one of: previously obtained resource usage data; and a previously generated workload signature. In this example, the system 200 may comprise a data store 250 adapted to store the historical information (including, for example, resource usage data, workload signatures, an/or predicted resource usage), and so the data analysis unit 230 may access the data store 250 to obtain historical workload information when it may be required.

The system 200 also comprises a prediction unit 240 that may predict resource usage of a second application based on the workload signature of the first application (as generated by the data analysis unit for example). To predict the resource usage, the prediction unit may analyze historical prediction information relating to at least one of: a previously generated workload signature; and previously predicted resource usage. Thus, similarly to the data analysis unit 230, the prediction unit may access the data store 250 to obtain historical prediction information when it may be required.

Based on predicted resource usage, the resource allocation unit 224 may allocate at least some or all of the resources 210 for the second application.

As will be apparent from the above description, a workload prediction resource may be provided by a cloud-computing system. Also, a resource allocation component for managing or allocating resources for application usage may be provided or implemented by a cloud-computing system.

With reference to the following description made with regard to a cloud computing system, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premise cloud model may include at least five characteristics, at least three service models, and at least four deployment models.

Characteristics may be as follows:

On-demand self-service: a cloud consumer can unilaterally provide computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may be as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
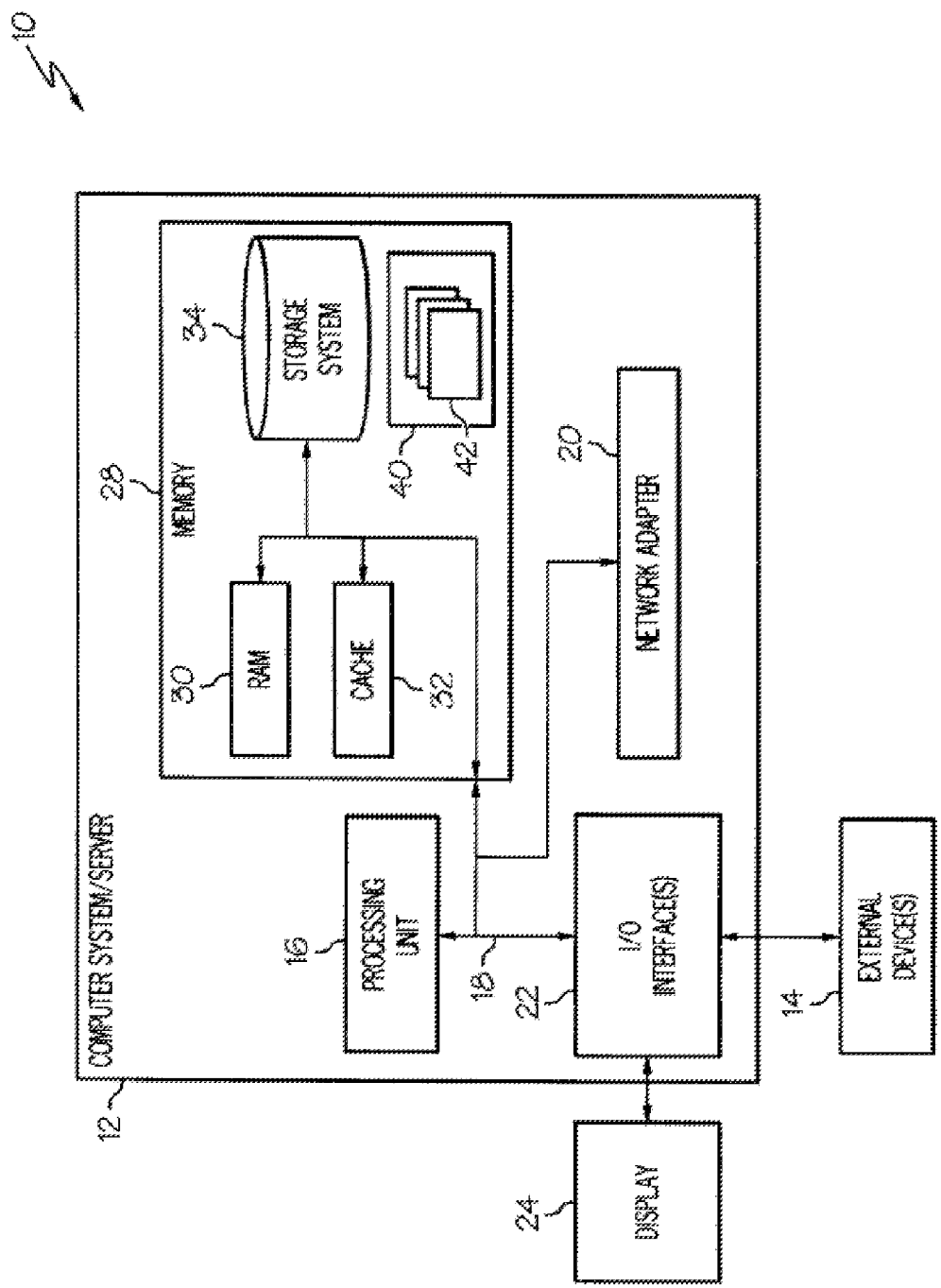
FIG. 3 illustrates a cloud system node.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
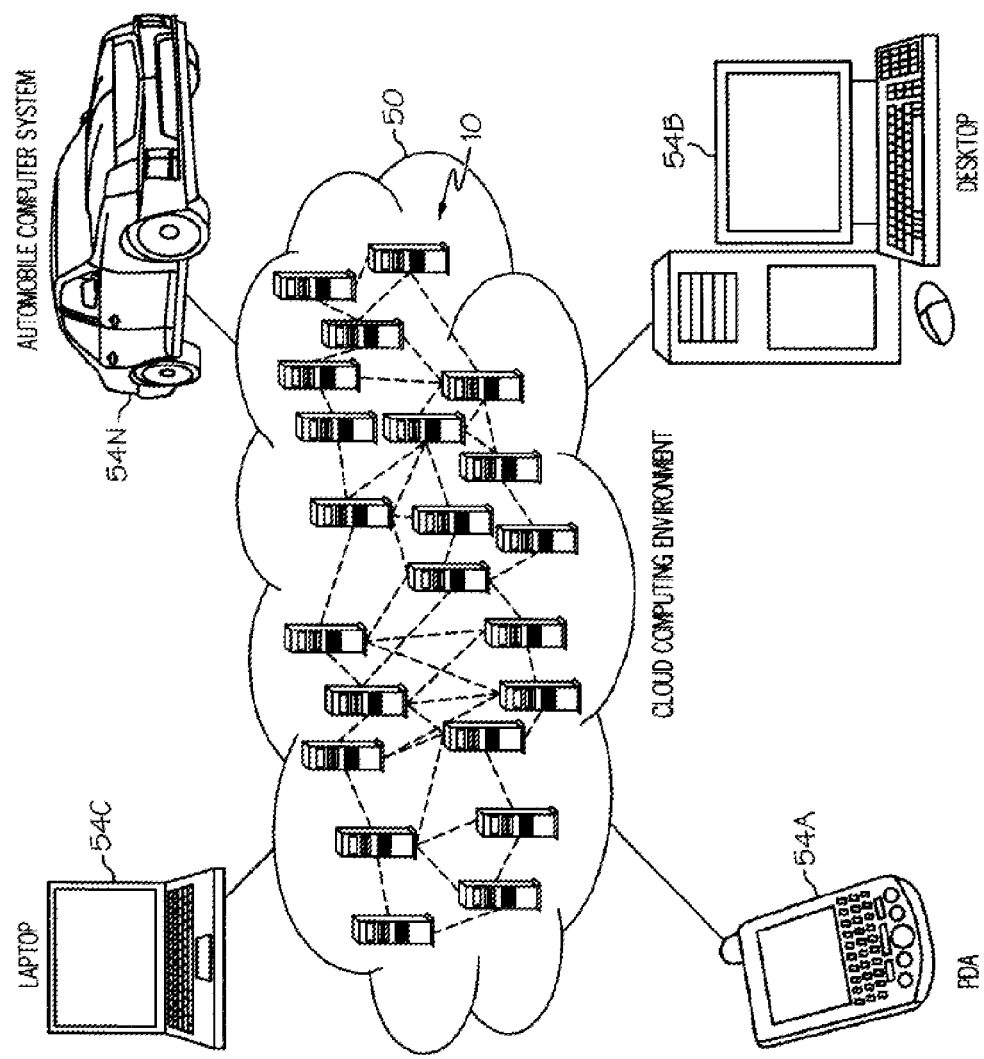
FIG. 4 illustrates a cloud computing environment according to an embodiment.

Referring now to FIG. 4, illustrative cloud computing environment or cloud computing system 50 is depicted. This can, in embodiments, be equated to the cloud system 200 as depicted in FIG. 2. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
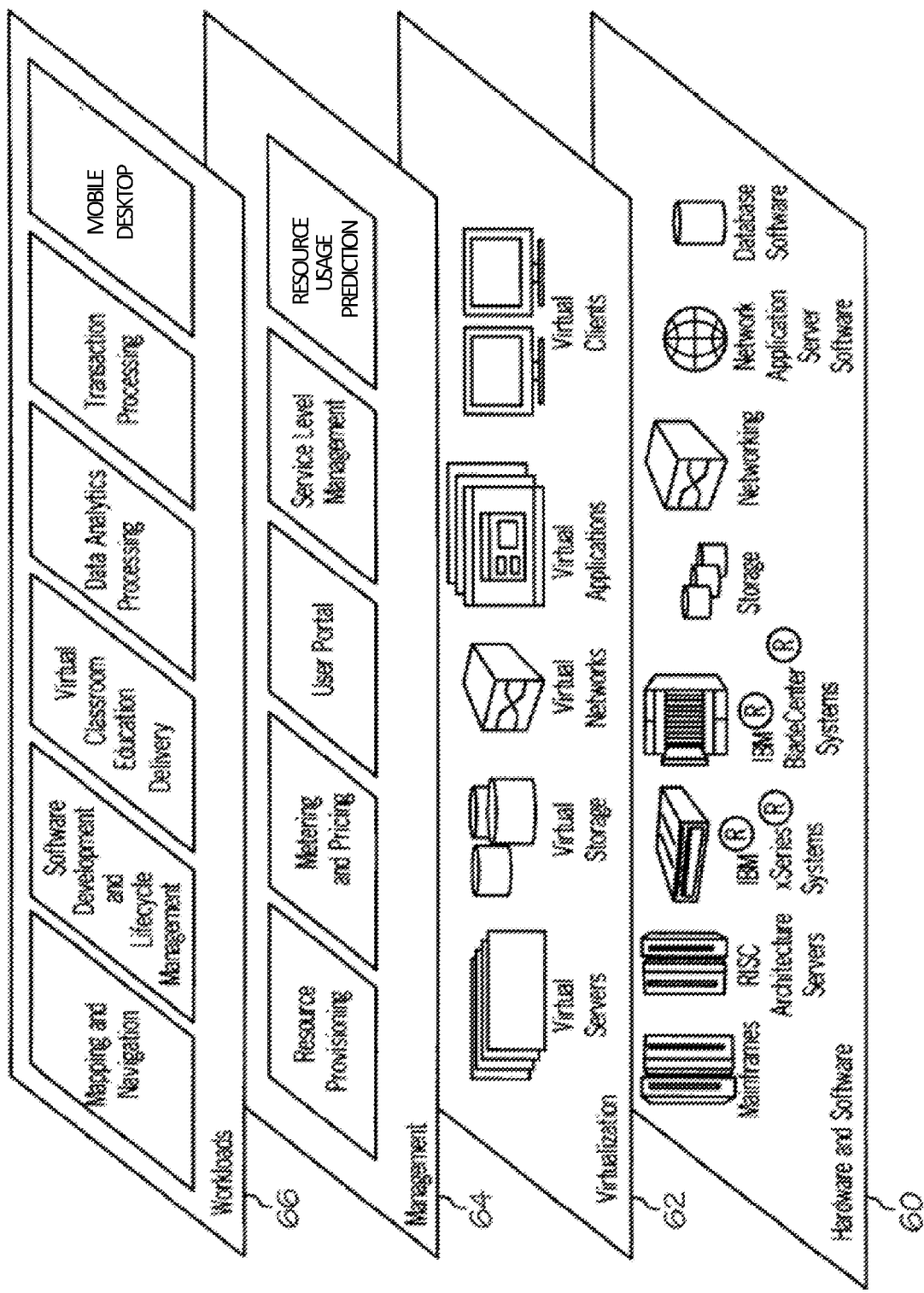
FIG. 5 illustrates cloud abstraction mode layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Resource usage prediction provides for predicting resource usage of an application according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for application workload prediction, the method comprising:
monitoring resource usage of a first application to obtain resource usage data associated with the first application;
generating a workload signature for the first application based on the obtained resource usage data, the workload signature comprising information relating to static and time variant resource usage of the first application, and a geolocation defining an approximate spatial location of a source of network traffic influencing the static and time variant resource usage of the first application;
predicting resource usage of a first instance of a second application based on the workload signature of the first application, wherein predicting the resource usage of the first instance of the second application includes using the workload signature to infer the first application performs a first type of workload associated with a classification of the first application; and deriving, by classification of the second application, that the second application performs a second type of workload that exhibits resource usage corresponding to the classification of the first application, and wherein predicting the resource usage of the first instance of the second application includes predicting that a time-related event not yet observed by the second application is probable to occur based upon the second type of workload and the first type of workload being performed by applications each classified under the classification; and
allocating resources for the second application based on the predicted resource usage of the second application according to the workload signature of the first application.

2. The method of claim 1, wherein the workload signature further comprises information relating to trigger events upon which the time variant resource usage depends; and
wherein the step of predicting resource usage of the second application is further based on forecast information relating to one or more expected future events.

3. The method of claim 2, wherein the forecast information comprises event information describing a predicted or planned event, the information comprising a description of at least one of: the event type; the event timing; the event duration; related resources; an impact on resources; a value of an event parameter; a dependency of the event on another event; and a dependency of the event on resources.

4. The method of claim 1, wherein the step of monitoring resource usage of the first application comprises:
obtaining run-time statistics relating to the execution of the first application; and generating resource usage data based on the obtained run-time statistics.

5. The method of claim 1, wherein the step of generating a workload signature comprises:
analyzing historical workload information relating to at least one of: previously obtained resource usage data; and a previously generated workload signature.

6. The method of claim 1, wherein the predicting resource usage of a second application comprises:
analyzing historical prediction information relating to at least one of: a previously generated workload signature; and previously predicted resource usage.

7. The method of claim 1, further comprising:
storing at least one of: the resource usage data; the workload signature; and predicted resource as historical information for use in at least one of: generating a workload signature; and predicting resource usage of the second application.

8. The method of claim 1, wherein at least one of: generating a workload signature; and predicting resource usage of a second application, comprises:
obtaining at least one of resource usage data and workload signature information from a cloud-based information server.

9. A computer program product for application workload prediction, the computer program product comprising a computer readable storage medium having program instructions embodied therewith, the program instructions executable by a processing unit to cause the processing unit to perform a method comprising:
monitoring resource usage of a first application to obtain resource usage data associated with the first application;
generating a workload signature for the first application based on the obtained resource usage data, the workload signature comprising information relating to static and time variant resource usage of the first application, and a geolocation defining an approximate spatial location of a source of network traffic influencing the static and time variant resource usage of the first application;
predicting resource usage of a first instance of a second application based on the workload signature of the first application, wherein predicting the resource usage of the first instance of the second application includes using the workload signature to infer the first application performs a first type of workload associated with a classification of the first application; and deriving, by classification of the second application, that the second application performs a second type of workload that exhibits resource usage corresponding to the classification of the first application, and wherein predicting the resource usage of the first instance of the second application includes predicting that a time-related event not yet observed by the second application is probable to occur based upon the second type of workload and the first type of workload being performed by applications each classified under the classification; and
allocating resources for the second application based on the predicted resource usage of the second application according to the workload signature of the first application.

10. A system for application workload prediction, system comprising:
a processor executing instructions stored in a memory device, wherein when executed, the instructions cause the processor to:
monitor resource usage of a first application to obtain resource usage data associated with the first application;
generate a workload signature for the first application based on the obtained resource usage data, the workload signature comprising information relating to static and time variant resource usage of the first application, and a geolocation defining an approximate spatial location of a source of network traffic influencing the static and time variant resource usage of the first application;
predict resource usage of a first instance of a second application based on the workload signature of the first application, wherein predicting the resource usage of the first instance of the second application includes using the workload signature to infer the first application performs a first type of workload associated with a classification of the first application; and deriving, by classification of the second application, that the second application performs a second type of workload that exhibits resource usage corresponding to the classification of the first application, and wherein predicting the resource usage of the first instance of the second application includes predicting that a time-related event not yet observed by the second application is probable to occur based upon the second type of workload and the first type of workload being performed by applications each classified under the classification; and
allocate resources for the second application based on the predicted resource usage of the second application according to the workload signature of the first application.

11. The system of claim 10, wherein the workload signature further comprises information relating to trigger events upon which the time variant resource usage depends; wherein when executed, the instructions further cause the processor to predict resource usage further based on forecast information relating to one or more expected future events.

12. The system of claim 11, wherein the forecast information comprises event information describing a predicted or planned event, the information comprising a description of at least one of: the event type; the event timing; the event duration; related resources; an impact on resources; a value of an event parameter; a dependency of the event on another event; and a dependency of the event on resources.

13. The system of claim 10, wherein the when executed, the instructions further cause the processor to:
obtain run-time statistics relating to the execution of the first application; and
generate resource usage data based on the obtained run-time statistics.

14. The system of claim 10, wherein when executed, the instructions further cause the processor to analyze historical workload information relating to at least one of:
previously obtained resource usage data; and a previously generated workload signature.

15. The system of claim 10, wherein when executed, the instructions further cause the processor to analyze historical prediction information relating to at least one of:
a previously generated workload signature; and previously predicted resource usage.

16. The system of claim 10, when executed, the instructions further cause the processor to store at least one of: the resource usage data; the workload signature; and predicted resource usage as historical information.

17. The system of claim 10, wherein when executed, the instructions further cause the processor to obtain at least one of resource usage data and workload signature information from a cloud-based information server.

* * * * *